April 21, 1959 E. M. WELCH 2,882,782
PHOTOGRAPHY AND PROJECTION APPARATUS
Filed Nov. 6, 1953 7 Sheets-Sheet 1

INVENTOR
Earl M. Welch
BY Gustav Miller
ATTORNEY

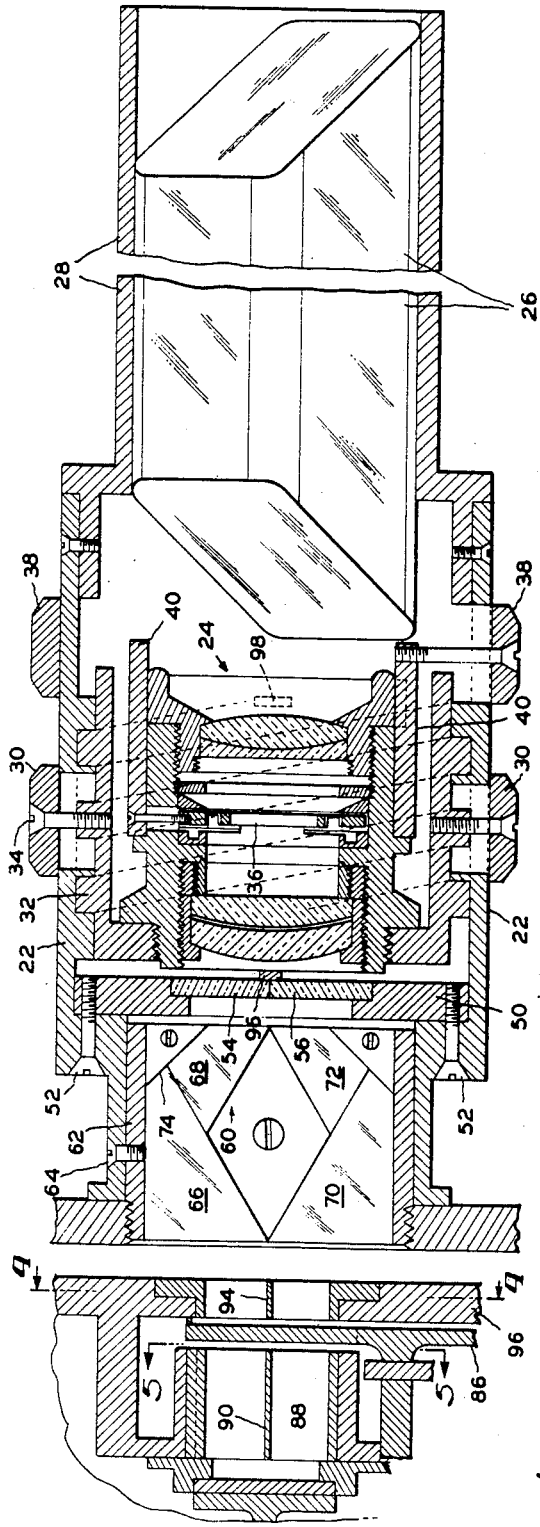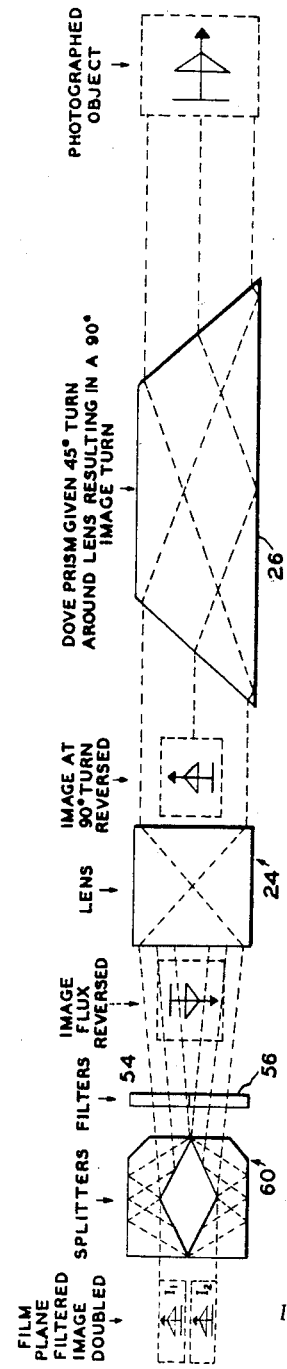

April 21, 1959 E. M. WELCH 2,882,782
PHOTOGRAPHY AND PROJECTION APPARATUS
Filed Nov. 6, 1953 7 Sheets—Sheet 3
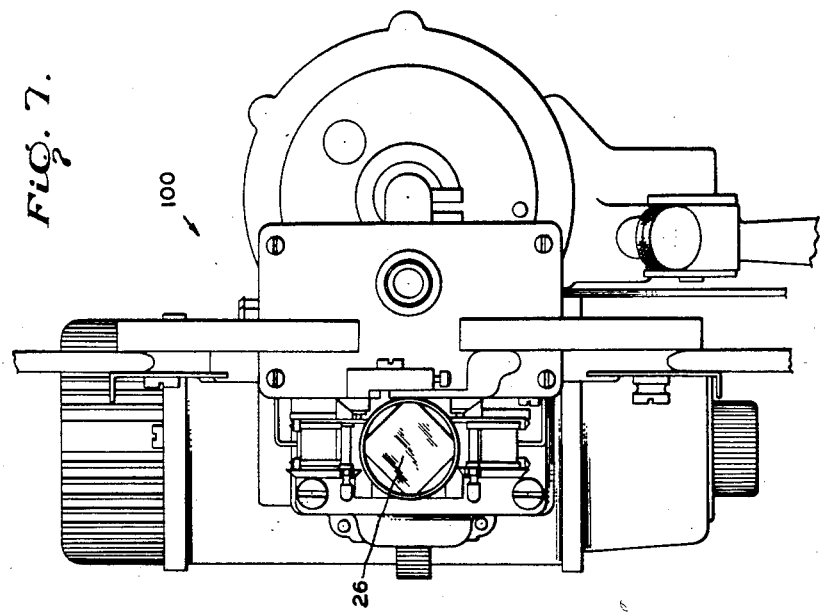
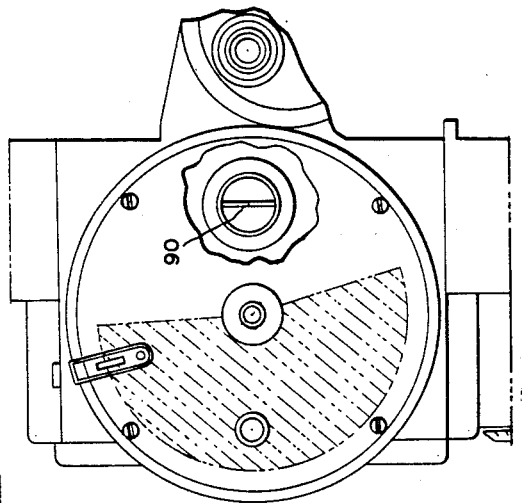
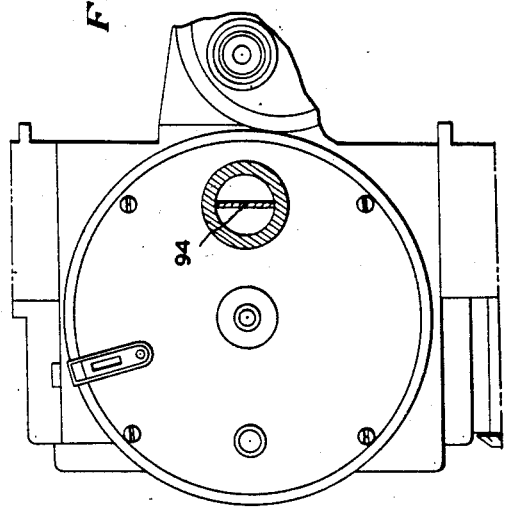
INVENTOR
Earl M. Welch
BY
ATTORNEY

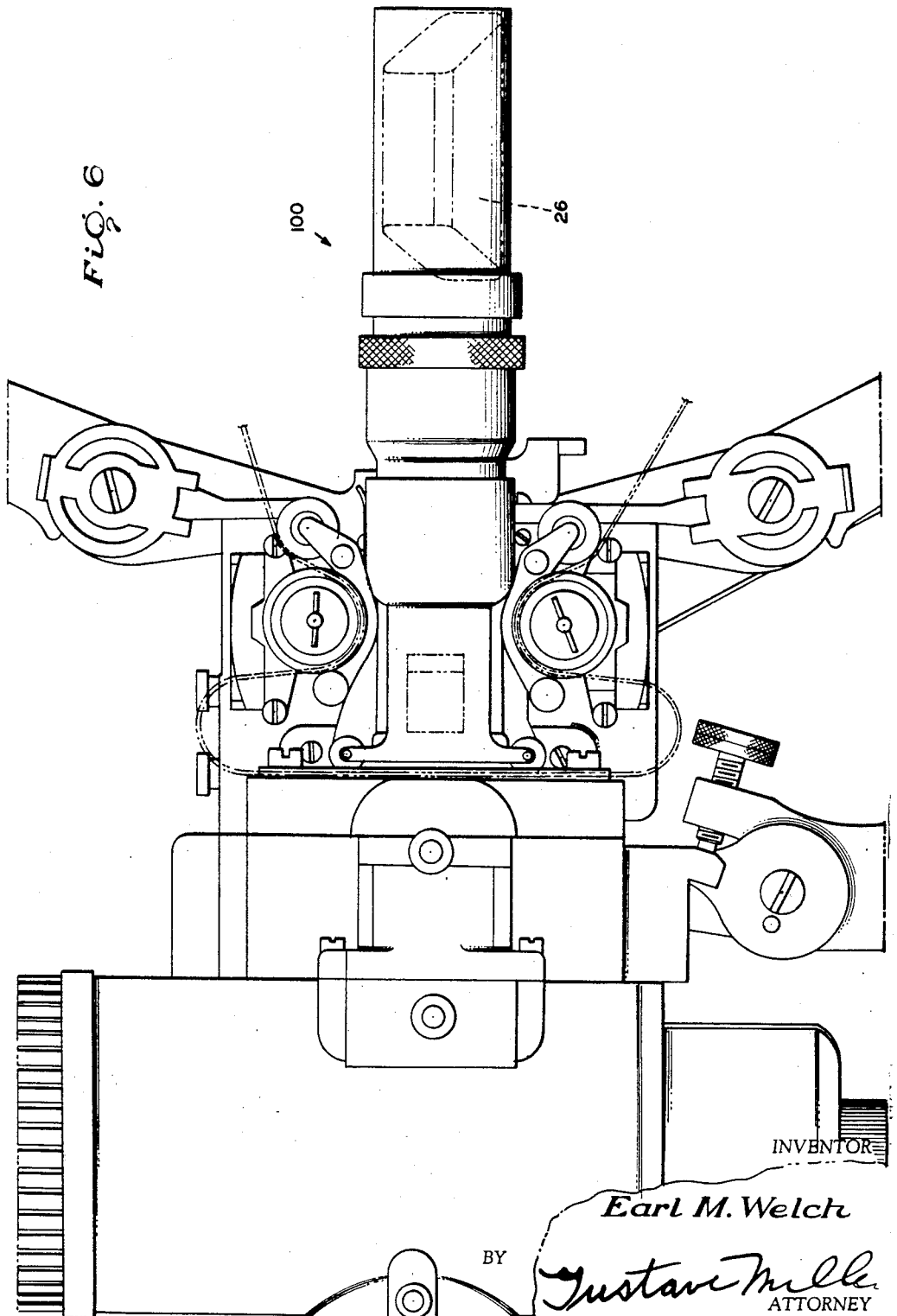

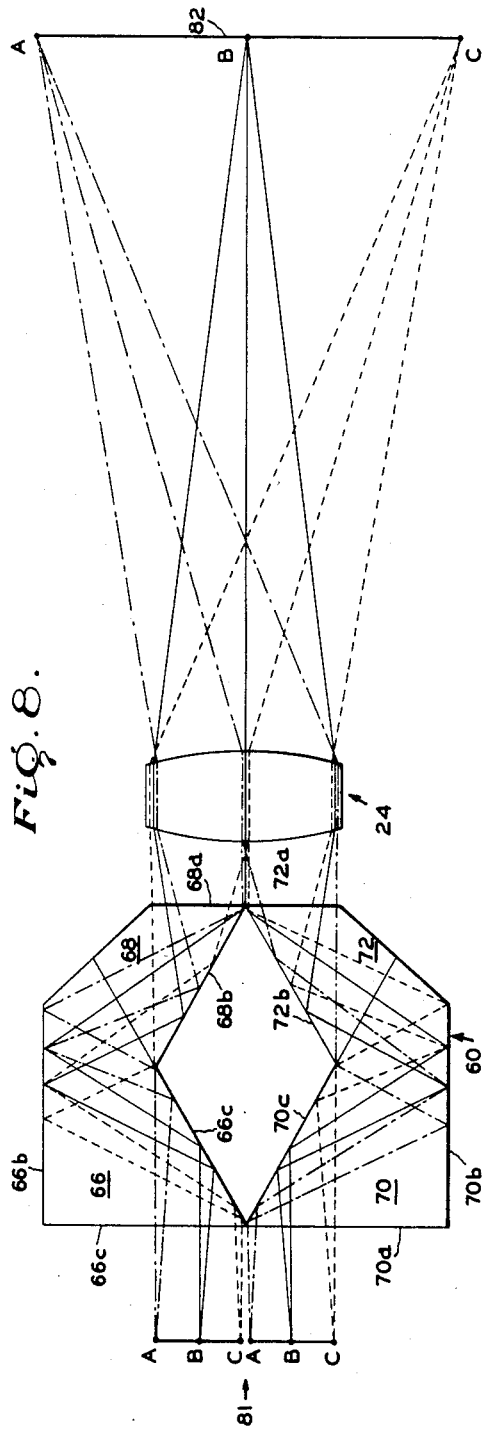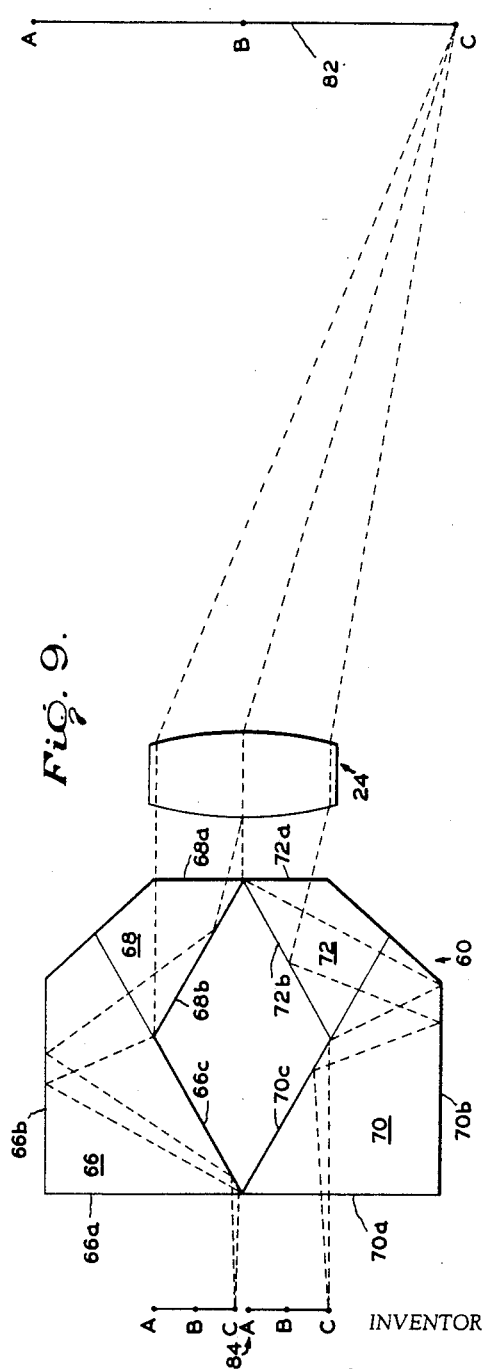

April 21, 1959   E. M. WELCH   2,882,782
PHOTOGRAPHY AND PROJECTION APPARATUS
Filed Nov. 6, 1953   7 Sheets-Sheet 6
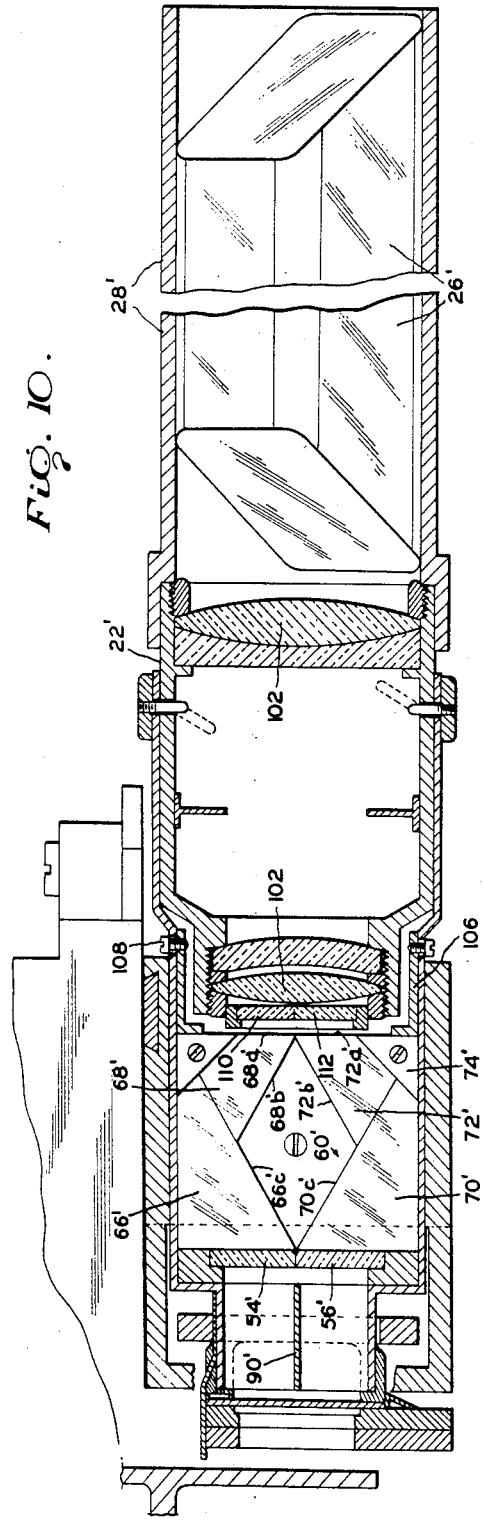
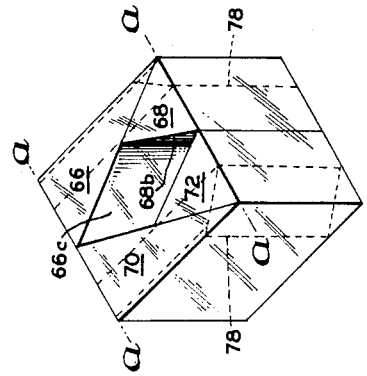
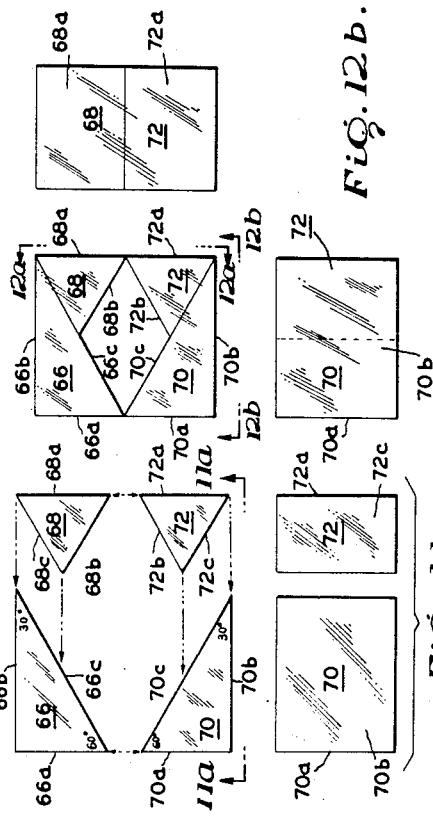
INVENTOR
Earl M. Welch
BY Gustave Miller
ATTORNEY April 21, 1959 E. M. WELCH 2,882,782
PHOTOGRAPHY AND PROJECTION APPARATUS
Filed Nov. 6, 1953 7 Sheets-Sheet 7

INVENTOR
Earl M. Welch.
BY Gustave Miller
ATTORNEY

United States Patent Office 2,882,782
Patented Apr. 21, 1959

2,882,782
PHOTOGRAPHY AND PROJECTION APPARATUS
Earl M. Welch, New York, N.Y.
Application November 6, 1953, Serial No. 390,644
1 Claim. (Cl. 88—1)

This invention relates to photography and to the projection of pictures onto a screen, and more particularly to an optical system for cameras and projectors which provides a double image to permit the production and projection of color pictures using standard black and white film and techniques, and to also permit the production and projection of films with a three dimensional effect, either in black and white or in color.

The invention provides a simple attachment which is applicable to use in either motion picture or still picture photography and projection and provides a simultaneous side-by-side production of two images in black and white which can subsequently be reproduced as a single image either in black and white or in natural colors and either with or without a three dimensional effect by means of a projector provided with a reconverting apparatus.

The techniques and processes for the manufacture and processing of color film are quite complicated, with the result that the price of color film is very high and often beyond the economic means of the average photographer.

While various optical systems are known for the production of color photographs using black and white film, most of the known systems do not utilize to the best advantage the available light when taking photographs. That is, most of the presently known optical systems for obtaining color pictures using black and white film obtain the necessary double image by forming one of the images by direct light transmission and forming the other image by a mirror reflection. In such systems, a large percentage of the light transmitted by the lenses is wasted and the exposure must be correspondingly increased to obtain images of satisfactory density.

An optical system for producing color pictures with black and white film in accordance with the basic principle of the invention of this application was initially disclosed in my application, Serial No. 342,619, filed June 27, 1940, which matured into Patent No. 2,280,989, patented April 28, 1942.

The patent just mentioned discloses an optical system for taking color photographs using black and white film, in which a prism assembly for splitting the image, in a camera, or for integrating or superimposing the split images, in a projector, is symmetrically positioned on either side of the optical axis of the lens system of the camera or projector. The prism assembly disclosed in my prior patent requires the use of at least six separate prism elements which are assembled into a unitary structure in such manner as to split the image produced by the lens system into two side by side identical images. These two separate images are subsequently passed through separate color filters, such as an orange-red filter and a blue-green filter, before striking the film which is being exposed. Two side by side images are formed on the film, each image being modified in accordance with the filter through which the light rays forming the given image pass before reaching the film. The film containing the two side by side images is then subsequently run through a projector which is provided with a similar prism assembly and filter arrangement, which serve to integrate the split images, so that the two side by side images are ultimately superimposed to form a single resultant image in color.

While the color photography and projection apparatus of my prior patent performs very satisfactorily, it has the disadvantage that the image splitting prism assembly disclosed therein is quite expensive to manufacture and sell since it requires at least six prism elements in its construction which must be precisely matched and dimensioned.

Accordingly, it is an object of this invention to provide an apparatus for the taking and projection of color photographs using black and white film which is simple to operate and inexpensive to manufacture.

It is a further object of this invention to provide an apparatus for taking and projecting color photographs using black and white film and the ordinary techniques of black and white photography.

It is a still further object of this invention to provide an optical system for taking and projecting color photographs using ordinary black and white film which may be attached as a simple accessory on a conventional camera or projector either of the motion picture or still picture type.

It is another object of this invention to provide an optical system for providing a double image which is simple in construction and inexpensive to manufacture.

Still another object of this invention is to provide an optical system for providing a double image which is an improvement over the optical system disclosed in my prior Patent 2,280,989.

Another object of this invention is to provide a photographic production and projection apparatus in which means are provided for obtaining a three dimensional effect either in color or in black and white.

In accordance with these objectives, this invention provides a prism assembly which is symmetrically positioned with respect to the optical axis of the lens system of the camera or projector. The prism assembly serves as an image splitting device in a picture taking apparatus and as an image integrating device in a picture projection apparatus. The prism assembly comprises four separate prisms, two of which are identical equilateral prisms. Each equilateral prism has three base portions each of which is at exactly a sixty degree angle from the plane of each of the other base portions. The other two prisms are right angle prisms having two base portions which are mutually perpendicular to each other and a hypotenuse portion which is at exactly 60 degrees relative to one of the base portions and 30 degrees relative to the plane of the other base portion. The four prisms just described are formed into two sub-assemblies, each sub-assembly containing one right angle prism and one equilateral prism, with the right angle prism and equilateral prism being brought into optical contact with each other in such manner that a base surface of an equilateral prism is in contact with the hypotenuse surface of a right angle prism, with an apex of the equilateral prism in contacting relation with the 30 degree apex of the right angle prism.

The two sub-assemblies thus formed are then positioned in contacting relation with respect to each other and symmetrically disposed so that one of the sub-assemblies is on either side of the optical axis of the lens system of the camera or projector. The two sub-assemblies just described provide a means for splitting the photographic image projected by the lens system of the camera into two separate and distinct paths which produce separate and distinct side by side images which are then passed through separate color filters before reaching the black and white film which is being exposed.

Means may be incorporated in the picture taking apparatus for causing the two images to be slightly dissimilar so that a three dimensional effect is provided when the two images are recombined and projected. In accordance with a further feature of the invention, means are provided in the projecting apparatus for shifting the prism assembly with respect to the lens system of the projector in such manner as to obtain a displacement of the projected images which also provides a three dimensional effect. In both cases, the two images should be viewed through isolating filters to obtain the three dimensional effect.

The image splitting prism assembly is symmetrically positioned with respect to the lens system so that substantially all of the light transmitted by the lenses strikes the image splitting device and is transmitted onto the film. Although this transmitted light is divided into two equal parts by the image splitting device, each part impinges upon an area of film equal to one-half that of an ordinary picture, so that the amount of light on each part is substantially the same as it would be for an ordinary picture taken in the ordinary way without the image splitting assembly of the invention.

Furthermore, in accordance with this invention, there is no possibility of interference between the divided beams of light which produce the two images. The construction of the camera or projector and its lens system is entirely unaffected by the addition of the optical system of the invention. No change is required in any feature of ordinary black and white photography, and the focal length of the standard lenses with which the camera or projector is provided remains practically unchanged. In projection, the two images are brought into coincidence before passing through the projector lenses, so that no defects in superimposing one image upon the other is possible as the result of mismatching or other inconsistencies in the projector lenses.

In using the image splitting device of the invention, the size and position of the two images upon the film is maintained automatically regardless of the distance between the subject being photographed and the camera. Likewise, in projection, the two images are accurately superimposed without any adjustment whatsoever, regardless of the distance of the screen from the projector, it being assumed, of course, both in photography and in projecting that the normal camera or projector lenses are correctly focused in the usual manner by the usual lens focusing means. Lenses of varying focal lengths can be used without affecting the image splitting unit or its position. In short, the unit is simply installed in the camera or projector and may then be forgotten insofar as subsequent operation is concerned.

By the use of this invention in photography, films of very uniform density are obtained regardless of variations in the actinic strength of the light. This is due to the fact that any normally used black and white negative material possesses many times the latitude of any dye saturated material, whether the dyed film material is directly dye impregnated or of the dye coupler type. It therefore becomes possible to vary exposures or conditions considerably either over or under the optimum point and still obtain what is considered a normal exposure. It has been proven by many actual experiments that photographs taken throughout the day from early morning to early evening with no change in lens aperture or exposure time, or time or temperature of development, have densities so nearly the same that they are all so well within the limits of correct exposure and color value as to be considered uniform for all practical purposes. This is of very great practical importance in both motion picture and still photography since it eliminates the necessity of varying the light in the printing machine and insures positives of substantially correct density from one end of the roll to the other.

Finally, when this invention is used in color projection, there is a partial overlapping of the light beams from the two images after they emerge from the prism assembly which causes a slight neutralization of each color, thereby producing on the screen an image with pastel shades which is very natural in appearance and which may be observed over long periods of time with a minimum of eye strain. Also, the brilliancy of the image on the screen is increased because of the selective disposition of white light resulting from this neutralization. Increasing the brilliancy of the image on the screen has been a long standing problem in the projection of pictures in colors by the additive process, which, before this invention, had not been satisfactorily solved.

The features of this invention which are believed to be novel are set forth with particularity in the appended claims. The invention itself, however, both as to its organization and use, together with further objects and advantages thereof, may best be understood by reference to the following description taken in connection with the accompanying drawings, in which:

Fig. 3 is a plan view, partially in section, of the optical components of the invention as mounted in the camera of Fig. 1;

Fig. 3a is a schematic diagram showing the changes in orientation of the film image as provided by the various optical components of the optical assembly shown in Fig. 3;

Fig. 4 is a view along section line 4—4 of Fig. 3, showing the turret base plate of the camera of Fig. 1;

Fig. 5 is a view in section along line 5—5 of Fig. 3, showing the camera shutter and the intermittent mounting plate;

Fig. 6 is a side elevation of a conventional motion picture projector embodying the optical system of the invention;

Fig. 7 is a front elevation of the projector of Fig. 6;

Fig. 8 is a plan view showing diagrammatically the paths followed by the various light rays from the image to the film in photographing and conversely from the film to the screen in projection when using the optical system in accordance with the invention;

Fig. 9 is a simplified view similar to the view of Fig. 8 showing the path followed by a single point light source;

Fig. 10 is a plan view of the optical system of a projector designed to accomplish color projection from black and white film and including an additional filter unit and mechanical adjustment to secure the effect or a three dimensional quality, together with the aforementioned effect of selective natural color with black and white materials;

Fig. 11 is an exploded plan view showing the components of the prism assembly;

Fig. 11a is a side elevation of the exploded prism assembly of Fig. 11;

Fig. 12 is a plan view of the prism components of Fig. 11 when assembled;

Fig. 12a is a front elevation view of Fig. 12 as seen on line 12a—12a;

Fig. 12b is a side elevation of Fig. 12 as seen on line 12b—12b;

Fig. 13 is a perspective view of the prism assembly showing in dotted outline the 45 degree corner cuts made at the front of the prism assembly to prevent direct transmission of light through the prism assembly;

Figure 16A:
Figure 16B:
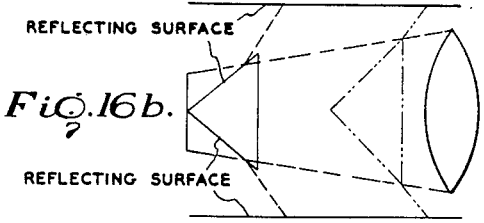
Figure 16C:
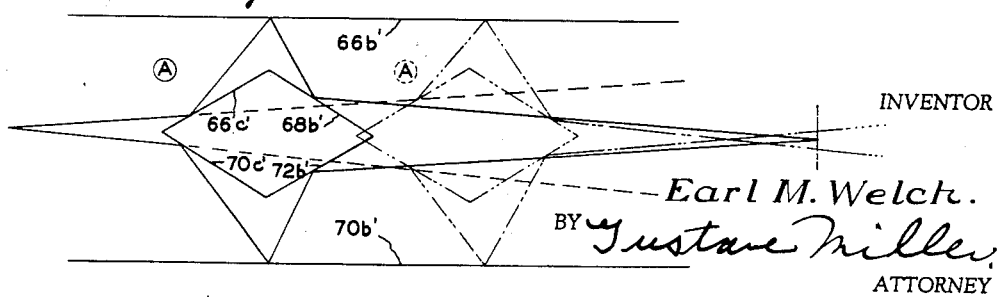

Figs. 14 (a) and (b) are diagrammatic illustrations of the effect of reducing the light transmitting area of the prism assembly to correspond to the lateral width of the diamond-shaped hollow reflecting space within the prism assembly;

Figs. 15 (a–f) are diagrammatic illustrations of the effect of using a barrier in front of the camera lens to provide dissimilar images for three dimensional effect;

Figs. 16 (a–c) are diagrammatic illustrations of the effect of shifting the prism assembly with respect to the lens in a projector.

Referring now to the drawings, and more particularly to Figs. 1–5, inclusive, the invention is shown as embodied in a standard motion picture camera generally indicated at 20, which may be considered to be typical of substantially any conventional motion picture camera.

The camera 20 is provided with a lens tube 22 in which is mounted a conventional lens system 24. In using the image splitting device of this invention to provide two images in the space ordinarily occupied by a single image on the film, the available space on the film is better utilized when the images are rotated 90 degrees from the normal orientation of the single image on the film. That is, in motion picture photography, instead of having the vertical axis of the image extend along the vertical axis of the film, or along the direction of film travel, the two images provided by the image splitting prism assembly are oriented with their vertical axes perpendicular to the vertical axis of the motion picture film and perpendicular to the direction of film travel. In order to provide this 90 degree rotation of the film images, a truncated dove prism 26 is provided as a component of the optical system, the prism 26 being mounted in a tubular extension 28 which is snugly but rotatably fitted into the front end of lens tube 22.

The dove prism 26 is rotated 45 degrees with respect to the optical axis of the lens system to thereby provide a 90 degree rotation of the image being photographed in accordance with the well known optical properties of prisms of this type. In addition to rotating the image 90 degrees, the dove prism 26 also reverses the left-right orientation of the image.

As will best be seen in Fig. 3, the lens system 24 is adjusted to critical focus in the well known manner by rotating focusing ring 30, which is coaxially positioned around the lens barrel 22 and is secured to the threaded lens mount 32 by means of holding screws 34. Adjustment of the light limiting aperture 36 is provided by rotation of iris ring 38 which is positioned around the outer surface of lens barrel 22, and which controls the motion of rotary linkage 40, which in turn controls the lens aperture.

Immediately to the rear of the lens system 24 is positioned a filter ring 50, which is rigidly attached to the rear end portion of the lens tube 22 by means of screws 52. The filter ring 50 securely holds two semi-circular filter glasses 54 and 56, each of which has one edge abutting an edge of the other along a line coinciding with the optical axis of the lens system 24 and coinciding with the longitudinal axis of the image splitting prism assembly generally indicated at 60. One of the filters 54 or 56 is a red-orange filter, and the other of the filters is a blue-green filter. For purposes of description of the invention, it will be assumed that filter 54 is the red-orange filter while filter 56 is the blue-green filter.

The image-splitting prism assembly 60 is positioned within an auxiliary tubular barrel 62, which is fitted into the end of the lens barrel 22 immediately to the rear of the filter ring 50, being retained in position within the lens barrel 22 by means of screw members 64.

The image-splitting prism assembly generally indicated at 60 is shown in detail in Figs. 11, 11a, 12, 12a, 12b and 13, and comprises four separate prisms, 66, 68, 70, and 72. Prisms 66 and 70 are right angle prisms, having two bases which are at 90 degrees with respect to each other and a hypotenuse portion which is at an angle of 60 degrees relative to one of the bases and at an angle of 30 degrees relative to the other of the bases. Prisms 68 and 72 are identical equilateral prisms each having three base portions which are at exactly a 60 degree angle from the plane of each of the other base portions.

As will best be seen by referring to Figs. 11, 11a, 12, 12a, 12b, and 13, the right angle prism 66 is provided with the base portions 66a, and 66b, which are mutually perpendicular to each other, and with the hypotenuse portion 66c, which makes an angle of 60 degrees with respect to the base portion 66a and 30 degrees with respect to the base portion 66b.

Similarly, the right angle prism 70 which is identical in size to the right angle prism 66, is provided with base portions 70a and 70b which are mutually perpendicular, these base portions being joined together by hypotenuse portion 70c, which makes an angle of 30 degrees with respect to base portion 70b and 60 degrees with respect to base portion 70a.

The equilateral prism 68 is provided with three equal base portions 68a, 68b, and 68c, which are each at an angle of 60 degrees with respect to each other. Similarly, the equilateral prism 72 is provided with equal base portions 72a, 72b, and 72c which are each at an angle of 60 degrees with respect to each other.

The prisms 66, 68, 70 and 72 are assembled with respect to each other in the manner best shown in Figs. 12 and 13. One base of the equilateral prism 68 is brought into optical contact with the hypotenuse portion 66c of the right angle prism 66. Since all of the base portions of the prism 68 are the same, any one of the base portions of that prism may be used for this purpose and in the view shown in Fig. 11, it is assumed that base portion 68c is brought into optical contact with the hypotenuse portion 66c of the right angle prism 66.

Similarly, one of the base portions of the equilateral prism 72 is brought into optical contact with the hypotenuse portion 70c of the right angle prism 70 in the manner shown in Fig. 12. It is assumed for this purpose that base portion 72c of the prism 72 optically contacts the hypotenuse portion 70c of the prism 70. The prism 68 is so positioned with respect to prism 66 that the 60 degree apex defined between the bases 68a and 68c of prism 68 is contiguous to the 30 degree apex defined between base portion 66b and hypotenuse 66c of the right angle prism 66.

Similarly, the prism 72 is so positioned with respect to the prism 70 that the 60 degree apex defined between the base portions 72a and 72c of the equilateral prism 72 is positioned contiguous to the 30 degree apex defined between base portion 70b and hypotenuse portion 70c of the right angle prism 70. The two prism groups 66—68 and 70—72 are each respectively fused or cemented together in accordance with any suitable method to provide two separate sub-assemblies. One sub-assembly consists of the right angle prism 66 joined to the equilateral prism 68, while the other sub-assembly consists of right angle prism 70 joined to equilateral prism 72. The two separate sub-assemblies are then placed in juxtaposition as shown in Fig. 12 in such manner that the 60 degree apex of prism 66 is in contact with the 60 degree apex of prism 70 and the apex defined by base portions 68a and 68b of prism 68 is in contact with the apex defined by base portions 72a and 72b of prism 72. The base portions 66b and 70b are parallel to each other and to the optical axis of the lens system. The base portions 66a and 70a are in alignment with each other and are perpendicular to the base portions 66b and 70b and are also perpendicular to the optical axis of the lens system. The base portions 68a and 70a are in alignment with each other and perpendicular to the base portions 66b and 70b and are also perpendicular to the optical axis of the lens system. The base portions 68a and 72a are in alignment with each other and perpendicular to the base portions 66b and 70b and to the optical axis of the lens system. The aligned base portions 66a—70a are parallel to the aligned base portions 68a—72a.

As will best be seen in Fig. 12, when the prisms are assembled together in the manner just described, the base portion 68b of prism 68 and the hypotenuse portion 66c of the prism 66 converge together toward the flat base portion 66b and meet in the exact longitudinal center of the composite unit. Similarly, the base portion 72b of the prism 72 and the hypotenuse portion 70c of the prism 70 converge together toward the base portion 70b and meet each other at the exact longitudinal center of the prism system. Each of the respective portions 66c, 68b, 70c, and 72b are inclined at an angle of 30 degrees with respect to the optical axis. Portions 66c, 68b, 70c, and 72b define the boundaries of a diamond-shaped hollow portion symmetrically located within the prism assembly.

The prism assembly 60 just described is a perfectly symmetrical hollow glass block having such balanced angles of transmission and reflection as to be a perfect optical flat which provides two separate and distinct optical light paths positioned symmetrically on either side of the optical axis of the lens system 24.

The prism assembly 60 as shown in Fig. 3 is positioned within the auxiliary tube 62 and is so oriented that the base portions 68a and 72a are disposed toward the front of the optical system while the base portions 66a and 70a are disposed toward the rear of the optical system. It will be understood, of course, that base portions 68a and 72a could just as well be positioned toward the rear of the optical system, with base portions 66a and 70c being disposed toward the front of the optical system.

The prisms 66, 68, 70, and 72 comprising the prism assembly 60 can be easily assembled with the greatest accuracy and mounted permanently within a suitable holding block 74 so that the arrangement and alignment of the prisms cannot possibly be disturbed. The holding block 74 is permanently and rigidly mounted within the auxiliary tube 62 and locked into position, so that the major axis of the hollow diamond-shaped area between the prism sub-assembly 66—68, on the one hand, and the prism sub-assembly 70—72, on the other hand, lies in exact alignment with the optical axis of the lens system 24, and so that the abutting edges of prisms 66 and 70, on the one hand, and of prisms 68 and 72, on the other hand, extend in a vertical direction, or, in other words, in the direction of film travel where the prism assembly is being used in conjunction with a motion picture camera. When the prism assembly has been adjusted as just described, the entire prism assembly is securely held in position by means of the locking screws 64.

It is important that the prism assembly be finally located and adjusted so that a point exactly at the center of the photographed object should appear at the exact center of each of the two images, that the center point of each image should lie on the horizontal center line of the film aperture, and that the center point of each image should be spaced equidistant between the sides of the film aperture and a line drawn vertically through the center of the film aperture. In order to accomplish this centralizing of the two images, it is sometimes necessary to slightly adjust the position of two prism assemblies relative to each other, and to depart very slightly from a parallel relation between surfaces 66b and 70b.

In order to prevent transmission of light through the light receiving surfaces 68a and 72a directly to the respective rear surfaces 66a and 70a, the front surfaces 68a and 72a are cut at a 45 degree angle, as indicated by the dotted lines 78 in Fig. 13. The cut portions are opaqued so that the combined lateral width of the remaining light transmitting portions of the surfaces 68a and 72a is substantially equal to the lateral width of the hollow diamond-shaped area defined by surfaces 66c, 68b, 70c, and 72b, The effect of reducing the combined width of faces 68a and 72a to substantially the lateral width of the diamond shaped hollow space may best be understood by reference to the diagram of Fig. 14 (a) and (b).

Figure 1:
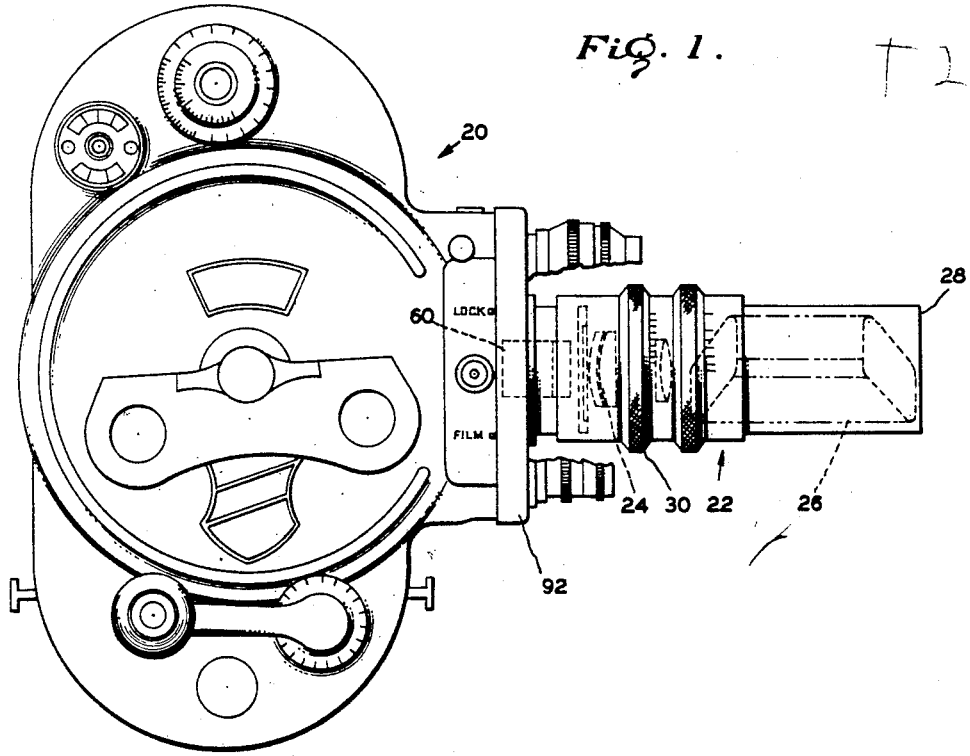
Fig. 1 is a side elevation of a motion picture camera provided with the optical system of the invention.
Figure 2:
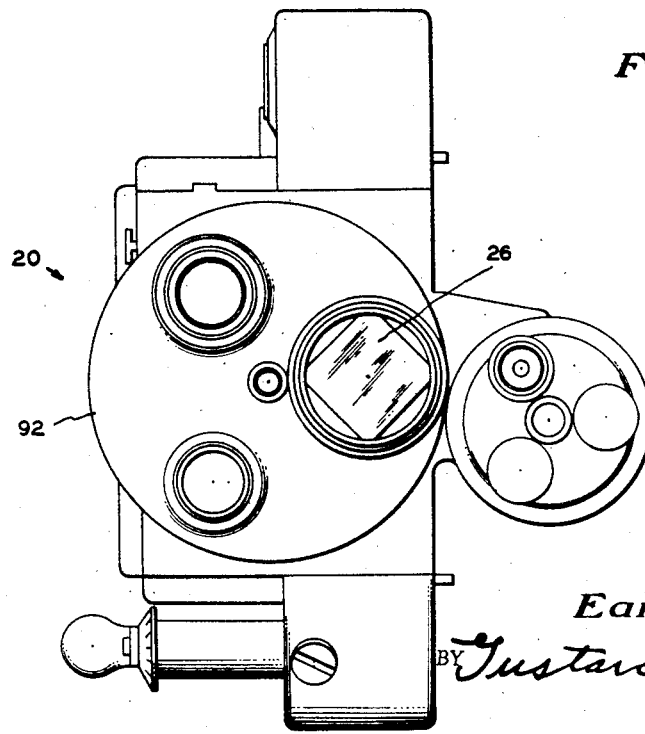
Fig. 2 is a front elevation of the camera of Fig. 1.
Figure 14A:
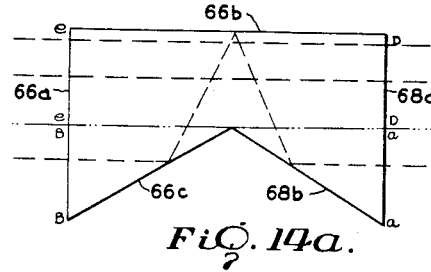

By referring to Fig. 14(a), which represents the upper portion of the prism assembly of Fig. 12, it will be seen that if the outer corner portion of the front surfaces 68a and 72a were not cut away and opaqued the total surface would transmit light. The portion a—a of surface 68a would transmit light due to subsequent reflection from surfaces 68b, 66b, and 66c, and thence to the area b—b. Also, the upper area d—d would transmit light directly, passing light from its source directly through the clear glass block and through the surface portion e—e. Therefore, the entire back surface portion 66a would be a transmission surface, half by reflection and half by direct transmission.

Figure 14B:
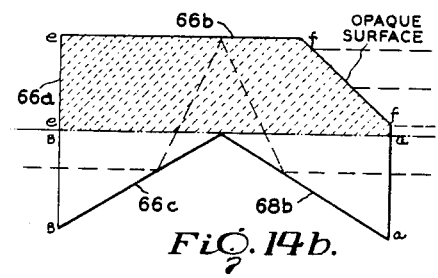
Figure 15A:
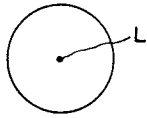
Figure 15B:
Figure 15C:
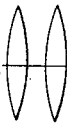
Figure 15D:
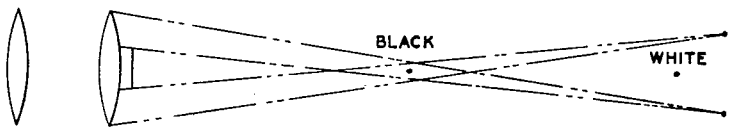
Figure 15E:
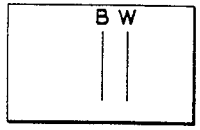
Figure 15F:
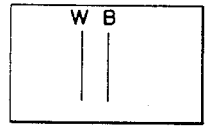

By reference to Fig. 14(b) which represents the same unit in which the upper half of the front surface has been ground away and opaqued as indicated also by the dotted line 78 of Fig. 13, it will be seen that the ground and opaqued surface f—f prevents any light transmission through the portion of the block above the line a—b. Consequently, the entire shaded section, including the portion e—e of the rear surface of the prism sub-assembly becomes entirely inoperative as far as the transmission of light is concerned. The only function of this portion of the prism sub-assembly is to permit the reflected rays from forward surface 68b to reach the upper surface 66b, and thence to pass by reflection to the rear surface 66c from whence it is reflected through rear surface area 66a.

When the surfaces 68a and 72a are ground so that these two faces have a combined lateral width equal to the lateral width of the hollow area, then the rear surfaces 66a and 70a will have a combined area double that of the front surfaces, and also double that of the film aperture. However, as previously explained, since only one half of the area of the rear surfaces is effective insofar as light transmission is concerned, the front surfaces 68a—72a and the rear surfaces 66a—70a will each have a light transmitting area substantially equal to the area of the film aperture.

Due to the grinding of the front surfaces 68a and 72a and the light blocking characteristics of reflective surfaces 68b and 72b, the prism assembly of the invention becomes a unit which is capable of substantially total transmission of light by reflection but which is incapable of direct light transmission. This is in contrast to the usual beam splitting device in which one image is obtained by direct transmission and the other image is obtained by reflection, requiring the use of extremely critical compensating blocks, and the use of semi-transparent mirrors which absorb approximately 50% of the transmitted light. Such systems also are unable to accommodate a lens aperture having a diameter which is larger than one half the horizontal width of the film aperture or larger than the vertical dimension of one image.

From the foregoing discussion, the following rules may be derived: (1) the lateral width of the hollow area formed by sides 66c, 68b, 70c, and 72b, which form four of the six reflective surfaces utilized by the prism assembly, must be substantially equal to the width of the film aperture. (2) the forward touching apexes of prisms 68 and 72 and the touching apexes of prisms 66 and 70 at the rear of the assembly must be substantially in line with the axis of the lens and in line with the lateral center of the film aperture. (3) the mirrored reflecting surfaces 66b and 70b must be equidistant from the axis of the lens and at a position whereby a light beam entering the transmission surfaces 68a and 72a and striking an exactly central point of reflective surfaces 68b and 72b must after reflection by surfaces 66b and 70b strike an exact central point of rear reflective surfaces 66c and 70c and being reflected therefrom strike a point on the light sensitive material at exact central positions between the vertical center and the two sides of the film aperture.

In practice, it has been found that surfaces 66b and 70b must be at substantially the same distance from the lateral apexes of the hollow area that these same apexes are from the axis of the lens and of the prism assembly. In other words, the distance of the surfaces 66b and 70b from the longitudinal axis of the lens and prism system must be twice as great as the distance of the lateral apexes of the hollow area from the same longitudinal axis.

The optical transition of the image which is being photographed can best be seen in its over-all perspective by reference to Fig. 3a which is a schematic view of the entire optical system. Considering that the optical system shown in Fig. 3a is that of a camera, the light rays from the object being photographed at the right-hand side of the figure pass through the dove prism 26 which rotates the image through an angle of 90 degrees, as previously described and also reverts the image to thereby reverse both its vertical and horizontal orientation. The image then passes through the lens system 24 which inverts the image, reversing its top and bottom orientation. The light rays then pass through the color filters 54 and 56 so that the light rays impinging upon the face 68a of prism 68 pass through the red-orange filter 54 while the light rays which impinge upon the face 72a of prism 72 pass through the blue-green filter 56. The image then passes through the prism assembly 60 which divides the light rays into two separate and distinct paths, resulting in the two side by side images $I_1$ and $I_2$ shown at the left-hand side of Fig. 3a. These two images are turned so that the vertical axis of each respective image is at 90 degrees with respect to the path of film travel.

The path followed by the light rays passing through the prism assembly 60 may best be seen by reference to Figs. 8 and 9. As is well known, light rays from any point of an object being photographed impinge upon and uniformly cover the front face of the lens system of the camera and then pass through the lens system and are focused by it to a point upon the film. Thus, as shown in Figs. 8 and 9, a light ray A, B, or C originating at the subject 82 is distributed over the front face of the lens in the form of a light flux of equal diameter to the limiting aperture to which the lens is set at the time of taking the picture. The light flux passes through the lens system 24 and leaves the lens system at an angle equal to the inclination necessary to reach a focus on the plane of the line ABC—ABC of the image 84 were it not intercepted by the prism assembly 60. The light passes through the surfaces 68a and 72a and strikes surfaces 68b and 72b. The light is reflected from surfaces 68b and 72b, respectively, away from the optical axis at an angle equal to the angle of incidence to the mirrored surfaces 66b and 70b, respectively. Surfaces 66b and 70b again reflect the light at the same angle as the angle of incidence to the surfaces 66c and 70c, respectively. Surfaces 66c and 70c reflect the light outwardly through the light transmitting surfaces 66a and 70a, the light being brought to a focus in the film plane ABC—ABC. In the case of surfaces 68b, 66c, 72b, and 70c, the light rays strike the respective surfaces at an angle greater than that necessary to accomplish substantially total optical reflection, so that none of the light striking the surfaces just mentioned pass through those surfaces, but instead all of the light is reflected. In the case of the surfaces 66b and 70b, the angle of incidence of the light is such that some of the light might be transmitted outwardly through those surfaces were the surfaces not covered with a reflecting or mirror coating to prevent the loss of illumination.

While it might be thought that the longer paths followed by the light rays in passing through the prism assembly 60 would shift the plane in which the rays are brought to a focus toward the lens system, it is found that the refractive index of the glass of the prism assembly in effect increases the focal length of the lens system sufficiently to compensate for the increased length of the light path through the prism assembly so that the light rays are brought to a focus in substantially the same plane as they would be if the prism assembly 60 were not being used.

As will be seen in Figs. 8 and 9, due to the passage of the light rays through the prism assembly in the manner just described, two images are formed, each identical with the subject 82, one image being formed by the light rays which pass through the prisms 66 and 68, and the other being formed by the light rays which pass through the prisms 70 and 72. All of the light rays from the subject 82 which strike the prism assembly 60 follow paths of exactly the same length, so that all light rays are brought to an exact focus upon the film or other light sensitive material by means of the conventional focusing adjustment incorporated within the lens system 24 and without the use of elaborate and critical optical compensating flats or blocks needed in image splitting devices generally in use. Although only one-half of the total light passing through the lens system 24 is utilized to produce each image, each image covers only one-half of the area normally utilized, so that the intensity of the light upon each half of the film is not materially diminished and no material increase in exposure time or effective aperture is required.

Since none of the light rays entering the prism surfaces 68a and 72a can pass through the reflecting surfaces 66c, 68b, 70c, and 72b, the rays forming the two respective images cannot possibly overlap when they converge from surfaces 66a and 70a. However, since the rays must traverse a distance of approximately one-half inch between the prism assembly 60 and the film in order to accommodate the conventional circular rotary shutter 86 and the aperture well 88, there is a tendency for the rays composing the extreme bottom of one image to impinge upon the area utilized for the extreme top of its companion image, and vice versa. Such overlapping of the top of one image with the bottom of the adjacent image tends to result in a partial neutralization of the color along the extreme top and bottom areas of the combined images. To prevent this from happening, it is advisable to insert into the aperture well a narrow opaque barrier 90 (Fig. 3) lying substantially in alignment with the optical axis. This barrier 90 prevents any light rays from striking the film between the two images and prevents light rays from one image striking the opposite image area.

In motion picture cameras equipped with a multiplicity of lenses, and consequently utilizing a rotary turret 92, it is sometimes advisable, although not absolutely necessary, to insert a second narrow opaque barrier 94 within the turret mounting plate 96 for similar reasons. The opaque barrier 94, as will best be seen in Fig. 3, should also be in alignment with the optical axis.

From Figures 8 and 9, it will be noted that rays of light from the subject 82 which impinge obliquely upon the lens system 24, such as, for example, the light rays from point A, are also projected obliquely by the lens system 24, so that more rays or a slightly greater quantity of light will pass through the prism units 70 and 72, on the opposite side of the optical axis from point A, than will pass through the prism units 66 and 68 on the same side of the optical axis as point A. Therefore, the area of one image adjacent point A on one of the film images might be somewhat denser than the equivalent point A on the other image on the film. To substantially equalize the illumination of the film by the light from such more or less oblique points of the subject 82, it is advisable to interpose between the lens and the prism assembly 60 a mask 96 which is positioned vertically adjacent the touching edges of prisms 68 and 72. As will best be seen in Fig. 3, the mask 96 may be positioned adjacent the filters 54 and 56 in vertical alignment with the longitudinal axis of the lens system, or optical axis. Although the use of the mask member 96 slightly reduces the total volume of light which reaches the film, this reduction is not serious and a substantially identical density for the corresponding parts of the two images is thereby assured. Also, in projecting in color, all risk of red discoloration in the sky area of the green image and of green discoloration in the foreground area of the red image is eliminated. A mask 96 of the sort just described for substantially equalizing the light transmission from an oblique point, such as point A of Fig. 8 will automatically equalize the ray transmission from the point C positioned at the same obliquity on the other side of the optical system, and will also equalize the light transmission of any other oblique rays between these extreme points of the subject and the center point B directly in line with the optical axis of the lens system 24.

If it is desired to achieve a three dimensional effect when the pictures are projected, one way of obtaining such an effect is to position a barrier 98, as shown in dotted line in Fig. 3, immediately in front of the lens system of the camera or between the front of the lens system and the rear portion of the dove prism. The barrier 98 in effect divides the lens into two perfectly matched components, which produce dissimilar images. These dissimilar images, when projected and viewed through isolating filters, such as polarizing filters, produce a three dimensional effect on the viewer.

The optical axis of each lens component is determined by the width of the barrier 98. The greater the width of the barrier 98, the greater the distance between the axes of the lens components produced by the use of the barrier. The effect of the use of barrier 98 may best be understood by reference to the graphical diagrams Figs. 15 (a) (b) (c) (d) (e) and (f). Fig. 15 (a) illustrates the axis of the lens system, viewed in front elevation, when a barrier 98 is not used. In this case, the lens axis L passes through the center of the lens. As will be seen in Fig. 15 (b), the use of barrier 98 causes the lens to be divided into two components having displaced axes L' and L".

As will be seen in Fig. 15 (c), a lens without a barrier looks at two aligned objects E and F from a single viewpoint, so that object F, farthest from the lens, is hidden behind object E. Fig. 15 (d) illustrates the effect of the use of the barrier 98, when looking at the same two objects. The portions of the lens on either side of the barrier 98 look at the objects E and F from two different viewpoints. One side of the lens sees the objects as shown in Fig. 15 (e), while the other portion of the lens sees the objects as seen in Fig. 15 (f). Each of the respective images shown in Figs. 15 (e) and 15 (f) is transmitted by one half of the prism assembly and the two images received upon the sensitized film are dissimilar. These images, when subsequently projected produce a three dimensional effect when viewed through isolating filters, such as polarizing filters.

To project a film of the character described onto a screen where the image splitting prism assembly has been used in conjunction with the taking of motion pictures, all that is required is a standard motion picture projector such as that generally indicated at 100 in Fig. 6, equipped with a standard projection lens system 102, Fig. 10, to which has been added the prism assembly generally indicated at 60', which is substantially identical to the prism assembly 60 described in connection with the picture taking apparatus, but which now serves the purpose of recombining the two images on the film into a single image for projection onto a screen.

The prism assembly 60' comprises the four prisms 66', 68', 70', and 72', which are substantially identical to the prisms 66, 68, 70, and 72 previously described. The light rays from the respective film images pass through the one or the other of the color filters 54' and 56' which are positioned adjacent the back side of the prism assembly, or the side directed toward the film. A dove prism 26' exactly similar to that previously described in connection with the camera assembly is positioned at the outer or front end of the lens assembly and is positioned at a 45 degree angle with respect to the optical axis of the lens and prism system in order to rotate the projected image by 90 degrees to compensate for the 90 degree rotation provided during the picture taking process. The prism 26' is located in a tubular extension 28' rotatably fitted into the outer end of the lens tube 22'. A barrier 90' may be provided between the film and the color filters 54' and 56' to prevent overlapping of the light rays from the top of one image and the bottom of the adjacent image, as previously explained in connection with barrier 90 used in the picture taking apparatus.

The sequence of events which produce a superposed image in color on a screen when the picture is projected is the exact reverse of that previously described in connection with the taking of the picture by means of a camera. That is, light from the projector light source shines through the film, the light from the film image on one side of the film passing through color filter 54' and through the prisms 66' and 68', the light from the other half of the film passing through the color filter 56' and the prisms 70' and 72'. The two images become superimposed between the front surfaces 68a' and 72a' of the prism assembly and the rear surface of the lens system 102 so that no errors in superimposition of the images can occur from any peculiarities or errors of the lens system. As will be explained later in more detail, the images may also be passed through polarizing filters where a three dimensional effect is desired, either in black and white or in color. If black and white pictures are desired, the color filters are, of course, not used in projection.

The manner in which the prism assembly 60' of the projector 100 converts the two images on the film into a superimposed image on the screen, as just described, will best be understood by reference to Fig. 9 by tracing the light rays in a reverse direction to that described in connection with the picture taking process, or, in other words, from film ABC—ABC to the subject 82, which, for this purpose, may be considered to be the screen.

The dove prism 26' rotates the superimposed image 90 degrees and also reverses the image (left-right orientation) to thereby restore the image to its normal upright position and to the same left-right orientation as that of the subject photographed.

A further feature of the projection system shown in Fig. 10 is the provision of an arrangement for displacing the two images to provide a three-dimensional effect when viewed through isolating filters such as polarizing glasses. An auxiliary tube 106 is rigidly attached either permanently or by means of suitable holding screws to the mounting block 74' for the prism assembly 60'. By means of the rigid connection between prism assembly 60' and the auxiliary tube 106, the prism assembly 60' may be shifted axially along the optical axis of the lens system. Infinitesimal displacement of the prism assembly 60' from the exact point of perfect superimposure of the two images on the screen will result in a considerable displacement of the two projected images which will contribute toward a three dimensional effect. This displacement is caused by alteration of the angle of the projected light beams as they emerge from the prism assembly 60', thereby affecting the angle at which the light beams emerging from the prism assembly are received by the lens system 102. When the prism assembly 60' has been shifted sufficiently to cause the desired displacement between the projected images, the auxiliary tube 106 and the prism assembly 60' may be rigidly locked in position by locking screws 108.

The effect produced by axially shifting the prism assembly 60' with respect to the lens system of the projector may best be understood by reference to the graphical diagrams of Fig. 16 (a) (b) and (c). In all projectors, the collecting area of the lens surface is considerably greater than the area of the film aperture. As a result, there is considerable inclination of the light rays outward from the film aperture to the lens surface, as shown in Fig. 16 (a).

Consider now that a wedge prism is placed in the path of the rays as shown in Fig. 16 (b) and moved along the axis from the aperture toward the lens from the full line position to the dotted position. It will be seen that the rays strike the prism nearer the apex of the prism when the prism is in the full line position nearest the aperture, and that as the wedge prism is moved to the dotted position nearer the lens, the diverging rays strike the surfaces of the prism at points further away from the apex.

Referring now to Fig. 16 (c), which shows a diamond-shaped reflecting wedge similar in shape to the hollow area defined by surfaces 66c', 68b', 70c', and 72b', it will be seen that movement of the wedge along the axis alters the position at which the inclined rays strike the rear reflecting surfaces 66c' and 70c', and also alters the position at which the reflected rays strike the secondary reflecting surfaces 66b' and 70b', as well as the position at which the reflected rays strike the forward reflecting surfaces 68b' and 72b' and the angle at which the rays are thence reflected through the lens and onto the viewing screen. The images are either combined at the point of focus or separated at the point of focus depending upon the relative position of the prism assembly with respect to the lens.

Once the axial position of the prism assembly has been adjusted with respect to the lens, either to have the two images in exact registration, or to have the images displaced for the three dimensional effect, the pre-set adjustment remains fixed for the given desired effect regardless of the distance between projector and screen.

When the three dimensional effect is desired, and the images have been offset by either use of the barrier 98 in the camera, or by displacing the prism assembly in the projector with respect to the projector lens, it is still necessary to project and view the images through isolating filters, such as polarizing filters. For this purpose, polarizing filters 110 and 112 are positioned in the path of the light rays as they leave the prism assembly 60'. The filters 110 and 112 should be polarized at 90 degrees with respect to each other, as is well known in the art. One edge of each of the polarizing filters 110 and 112 should abut one edge of the other filter in exact vertical alignment with the vertical image dividing line, which also coincides with the abutting edges of prisms 68' and 72' and with the optical axis. The image projected onto a viewing screen as a result of using the polarizing filters is unrecognizable unless viewed through similarly polarized viewing glasses. However, when viewed through such glasses, the projected image is not only in color but has a distinct relief or three dimensional quality.

It can be seen from the foregoing that there is provided in accordance with this invention an apparatus which permits the taking and projection of color pictures using standard black and white film and the methods of black and white photography. The apparatus of the invention by means of which this is accomplished is simple in construction and inexpensive to manufacture, and can be installed as a simple attachment on a conventional motion picture or still camera.

When the apparatus of the invention is used in either motion picture or still photography, the ordinary techniques and methods of black and white picture production can be followed throughout, and staining or dyeing of the film before projection is eliminated. In consequence, the present high cost of taking photographs and preparing them for projection in color is reduced to substantially the cost of ordinary black and white pictures.

The prism assembly of the invention utilizes the available light to best advantage, and provides the same density of illumination for each of the two images resulting from the image splitting operation as would normally be provided in a single image having twice the area of the split image.

Also, the prism assembly of the invention when used in projecting can be adjusted to provide a displacement between the projected images which provides a three dimensional effect when projected and viewed through polarizing filters.

The apparatus of the invention may also be used for projecting black and white pictures with or without the three dimensional effect by the simple expedient of removing the color filters before projecting.

Color pictures photogaraphed and projected by the use of this invention appear softer to the eye and more natural than those from dyed films, even though in the latter the natural colors have been reproduced with the greatest of spectroscopic accuracy. The pleasing, soft character of the colors produced on the screen using this invention are a desult of the fact that is projection there is a slight intermingling and blending of the rays from the orange-red and blue-green halves of the image, and to the fact that the aforementioned colors are being superimposed upon the neutral tones inherent in black and white projection, so that the vividness of the various resulting colors is slightly neutralized and made softer. Motion pictures made and projected with the aid of this invention, because of their softness of color and the accuracy with which the images are superimposed, can be observed without noticeable eye strain over much longer periods than can the usual color photographs using dyed film.

While there have been shown and described particular embodiments of the invention, it will be obvious to those skilled in the art that various changes and modifications may be made therein without departing from the invention and, therefore, it is aimed in the appended claims to cover all such changes and modifications as fall within the true spirit and scope of the invention.

Having thus set forth and disclosed the nature of this invention, what is claimed is:

An optical unit adapted for a camera or projector provided with a conventional objective, which consists of a prism unit adapted to be positioned in the camera or projector symmetrically with respect to the optical axis of the objective, said prism unit when used in a camera including means for receiving substantially all of the light rays passing through the objective of the camera, splitting them into two substantially equal halves and directing these halves side-by-side upon a light sensitive surface to form two identical images of the object at which the rays originate and when used in a projector for receiving substantially all of the light projected through two such images and combining these rays to form a single image, said prism unit consisting of two right triangular prisms having 30° and 60° complementary angles and two equilateral triangular prisms forming two sub-assemblies each composed of a right triangular prism with a side of an equilateral triangular prism joined to the 30° apex end of the hypotenuse side of the right triangular prism, so that a 120° angle is formed between the exposed portion of the hypotenuse side and the adjacent equilateral side, said sides of the 120° being substantially equal, the end faces of said sub-assemblies being parallel and the sub-assemblies being joined at the optical axis by bringing together their corresponding apexes at the ends of the 120° angle sides, whereby the end faces at the opposite ends of the unit will be substantially coextensive and normal to said optical axis, a shutter behind said prism unit, a flat opaque barrier axially aligned with said junctures of said apexes behind said prism unit, said barrier having a portion in front of and a portion behind said shutter to prevent overlapping of said identical images, the contacting apexes at the front and rear ends of the prism unit being so dimensioned as to deflect the optical axes of the sub-assemblies to obtain aligned side-by-side separation of said images on the light-sensitive surface in the camera and to combine the rays from said images to form a single image in the projector.

References Cited in the file of this patent

UNITED STATES PATENTS

| | | |
|---|---|---|
| 1,006,230 | Kollmorgen | Oct. 17, 1911 |
| 1,843,663 | Creigier | Feb. 2, 1932 |
| 2,050,224 | Gilmore | Aug. 4, 1936 |
| 2,137,570 | Gilmore | Nov. 22, 1938 |
| 2,217,907 | Kampfer et al. | Oct. 15, 1940 |
| 2,265,264 | Bunger et al. | Dec. 9, 1941 |
| 2,280,989 | Welch | Apr. 28, 1942 |
| 2,360,322 | Harrison | Oct. 17, 1944 |
| 2,403,733 | Mainardi et al. | July 9, 1946 |
| 2,678,580 | Erban | May 18, 1954 |

FOREIGN PATENTS

| | | |
|---|---|---|
| 15,318 | Great Britain | of 1905 |